United States Patent [19]
Cochran

[11] 3,760,370

[45] Sept. 18, 1973

[54] CALCULATOR WITH A NUMBER PROCESSING SYSTEM

[75] Inventor: Michael J. Cochran, Houston, Tex.

[73] Assignee: Tektronix, Inc., Beaverton, Oreg.

[22] Filed: Apr. 26, 1971

[21] Appl. No.: 137,212

[52] U.S. Cl. .............................................. 340/172.5

[51] Int. Cl. .............................. G06f 9/20, G06f 3/02

[58] Field of Search .................................. 340/172.5

[56] References Cited

UNITED STATES PATENTS

| | | | |
|---|---|---|---|
| 3,297,977 | 1/1967 | Grady et al. | 340/172.5 |
| 3,036,773 | 5/1962 | Brown | 340/172.5 |
| 3,315,233 | 4/1967 | Campo et al. | 340/172.5 |
| 3,298,001 | 1/1967 | Couleur et al. | 340/172.5 |
| 3,311,889 | 3/1967 | Birmingham et al. | 340/172.5 |
| 3,366,932 | 1/1968 | Beatson et al. | 340/172.5 |

*Primary Examiner*—Gareth D. Shaw
*Attorney*—Adrian J. LaRue

[57] ABSTRACT

An electronic calculator is disclosed having an entry unit with a keyboard which can be utilized either to store data in or to retrieve data from a storage unit with a plurality of storage elements. Entries can be made in the keyboard to produce store, address, and readdress indicator signals as well as data and addresses. An entry detector is provided to develop and store signals in response to the type of entries made in the keyboard. An address transfer unit is provided to receive addresses from the entry unit and addresses retrieved from the storage unit. In response to the signals developed by the entry detector, a transfer control unit operates to cause an address produced by the entry unit to locate a storage element in the storage unit either by directly addressing, or by indirectly addressing, or by successively indirectly addressing storage elements in the storage unit. Both data retrieved from the storage unit and data transferred from the entry unit can be utilized by an arithemtic unit in performing calculations.

9 Claims, 17 Drawing Figures

INVENTOR.
MICHAEL J. COCHRAN
BY Robert Mednick
ATTORNEY

FIG. 2
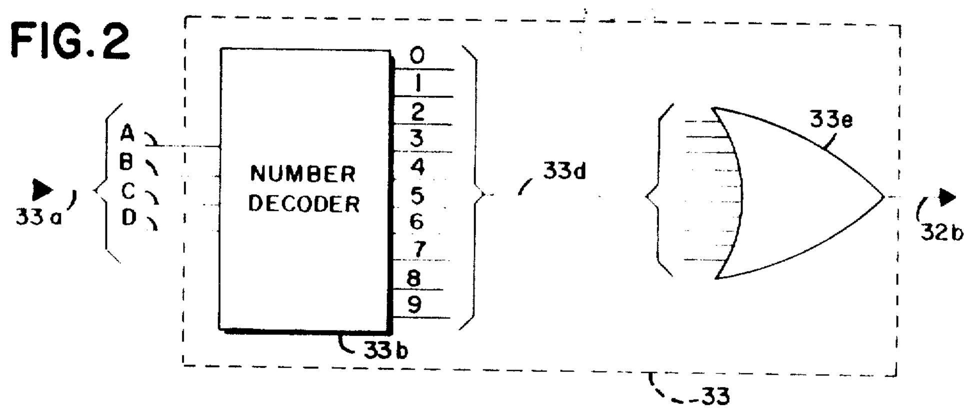
FIG. 4
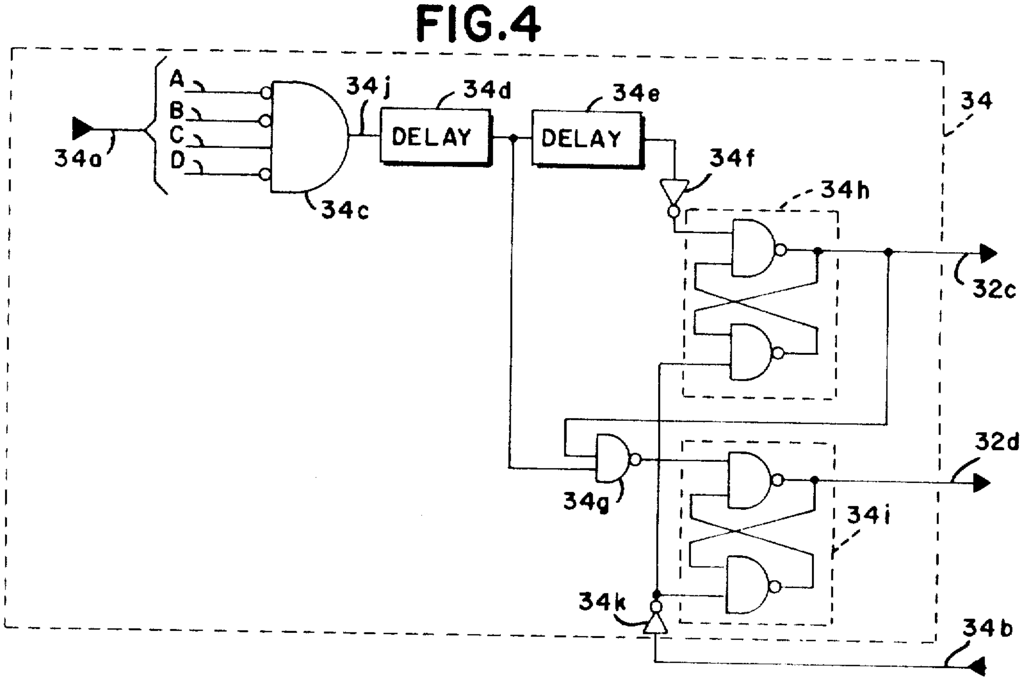
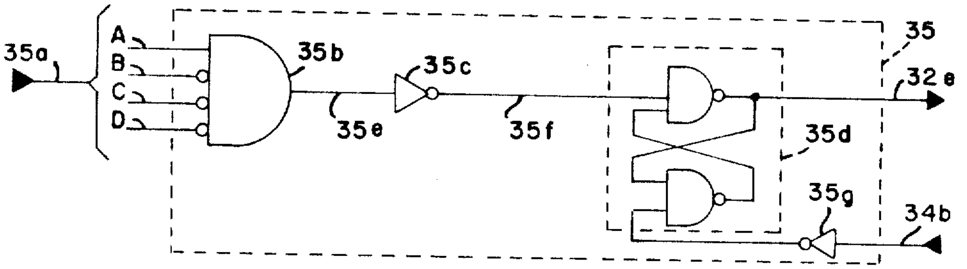
FIG. 5
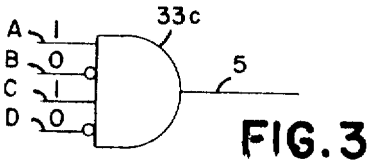
INVENTOR.
MICHAEL J. COCHRAN
BY Robert Mednick
ATTORNEY

INVENTOR.
MICHAEL J. COCHRAN

BY [signature]

ATTORNEY

INVENTOR.
MICHAEL J. COCHRAN
BY Robert Mednick
ATTORNEY

INPUT TO CONTROL MATRIX / OUTPUT OF CONTROL MATRIX
| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| M 1 | | X | | | | | | | | | | | | |
| M 2 | | | X | | | | | | | | | | | |
| M 3 | | | | X | | | | | | | | | | |
| M 4 | | | | | X | | | | | | | | | |
| M 5 | | | | | | X | | | | | | | | |
| M 6 | | | | | | | X | | | | X | | | |
| M 7 | | | | | | | | X | | | | | | |
| M 8 | | | | | | | | | X | | | | | |
| M 9 | | | | | | | | | | X | | | | |
| M 10 | | | | | | | | | | X | X | | | |
| M 11 | | | | | | | | | | X | X | X | X | X |
| M 12 | | | | | | | | | | | | | X | |
| M 13 | X | X | | | X | | X | | | | | | | |
| M 14 | | | | | X | | X | | X | | | | | |
| M 15 | | X | X | X | | | X | | | | | | | |
| M 16 | | X | X | | X | X | | X | X | | | | | |
FIG.7
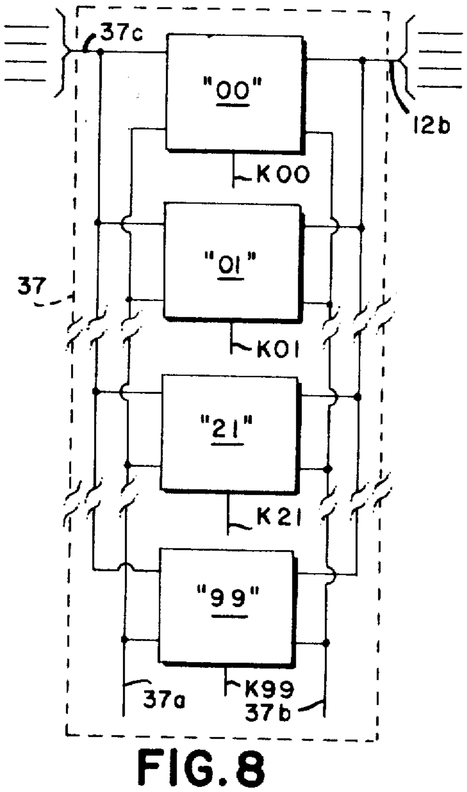
FIG.8
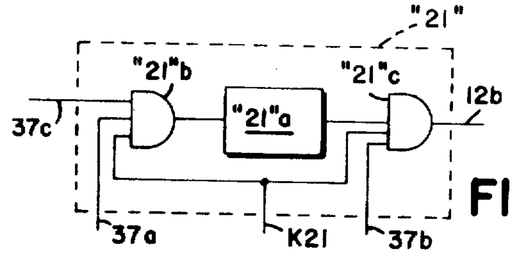
FIG.9
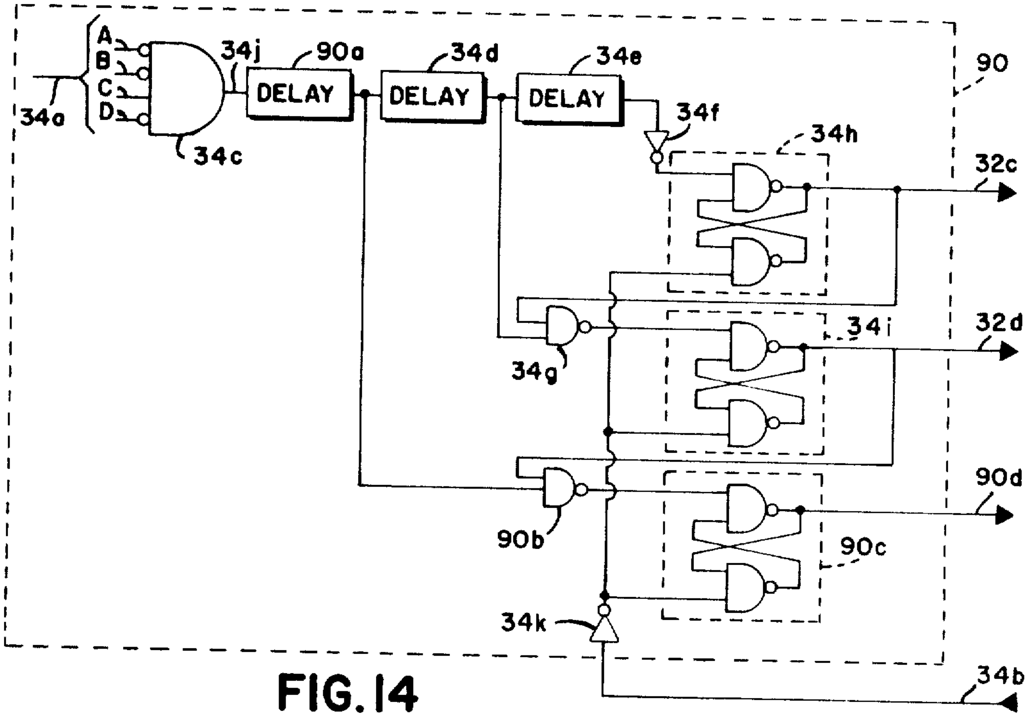
FIG.14

INVENTOR.
MICHAEL J. COCHRAN
BY Robert Medinick
ATTORNEY

CALCULATOR WITH A NUMBER PROCESSING SYSTEM

The present invention relates to a calculator with a number processing system, and more particularly relates to a calculator with a number processing system in which an address is utilized to locate a storage element by directly or indirectly addressing a storage unit with a plurality of storage elements in order to either store or retrieve data.

Mathematical expressions are generally written or stated in a universally standard manner. In evaluating a mathematical expression or solving a mathematical problem, procedures have been developed to make calculations which abide by certain mathematical rules. For many complex mathematical problems, each of the steps involved in the procedures for their solutions may be simple. However, these procedures are only well known to mathematicians or other such skilled persons having this special knowledge. For example, the solution of certain simultaneous equations with two variables may be obtained by use of mathematical matrices. A matrix is a rectangular array of numbers in rows and columns. Each position in the rectangular array forming the matrix is generally denoted by a letter such as "K" with numerical subscripts indicating a row and column of the matrix. Thereupon, to solve two of such simultaneous equations, the numbers in the matrix are combined by mathematical operations such as addition and multiplication in accordance with a mathematical rule known as Kramer's Rule. Each of the individual mathematical steps involved can be done by most persons, and preferably can be easily and quickly performed by a calculator. However, only few persons have the knowledge of the procedures for making such calculations.

For certain mathematical procedures, exemplified by the above procedure using matrices, it would be expedient that numbers be temporarily stored to be retrieved at a later selected time. In addition, it would be expedient to modify stored numbers or to select some of the stored numbers depending upon the results of partially completed calculations. Accordingly, it would be desirable to have a calculator that is capable of storing numbers and selectively retrieving stored numbers from locations in storage means which can be directly or indirectly addressed. Further, it would be desirable to have a calculator that can perform such operations in the manner in which the mathematical procedures are to be carried out, so that a person skilled in such procedures can easily operate the calculator.

In accordance with the present invention, a calculator with a number processing system is provided in which an address selector signal is developed to enable an address to locate a a storage element in a storage unit, and in which readdress elector signals are developed to enable other storage elements to be successively located in accordance with the number of readdress selector signals. An entry unit with a keyboard is shown that can produce numerical data and numerical addresses by the manual actuation of the same number keys. The entry unit is also sed to produce signals for an entry detector which develops and stores signals in accordance with the type of entries made in the keyboard. As a result, data or data numbers can be entered to be selectively stored or retrieved from either directly addressed locations, or from indirectly addressed locations, or from successive indirectly addressed locations. The retrieved data can be utilized by the calculator in performing calculation with each other as well as with entered data.

It is therefore an object of this invention to provide a calculator in which entries can be made in a sequential order that corresponds to the procedures for calculating mathematical expressions.

Another object of this invention is to provide a calculator with a number processing system in which a single actuating key enables an operator to selectively cause an entered number to be used either as an address or as data.

Still another object of this invention is to provide a calculator with a number processing system in which data can either be stored or recalled from a storage location determined by an entered address.

A further object of this invention is to provide a calculator with a number processing system in which data can either be stored or recalled from a storage location selected either directly or indirectly by an entered address.

A still further object of this invention is to provide a calculator with a number processing system in which an address for storage means may be utilized to successively obtain one or more other addresses in order to locate stored data.

It is also an object of this invention to provide a calculator that can perform calculations either with stored data or with entered data.

Another object of this invention is to provide a calculator that can easily be operated for the solution of mathematical equations by the use of matrices.

Still another object of this invention is to provide a calculator which can perform a variety of complex mathematical problems without requiring different procedures in manipulating entries and thereby reducing the possibilities of errors.

Another object of this invention is to provide a calculator with a number processing system which is low in cost and of simplicity in design.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only, and are not intended as a definition of the limits of the invention.

FIG. 2 is a symbolic diagram of the number detector shown in FIG. 1.

FIG. 3 is a logic diagram of an AND circuit illustrating the operation of the number decoder in the number detector shown in FIG. 2.

FIG. 4 is a logic diagram of the address indicator detector shown in FIG. 1.

FIG. 5 is a logic diagram of the store indicator detector shown in FIG. 1.

FIG. 7 is a chart showing the output response of the control matrix of FIG. 6c to all input count signals developed by the count decoder.

FIG. 8 is a detailed symbolic diagram of the number storage unit seen in FIG. 1.

FIG. 9 is a more detailed symbolic diagram of a typical storage element of the number storage unit seen in FIG. 8.

FIG. 14 is a logic diagram of another address indicator detector that may be used in the calculator with the number processing system of this invention in order to provide two readdress selector signals.

In the following description, since digital voltage levels exist on the various described inputs, outputs, or lines connected to the several components, and as these voltage levels are of two states, they will also be referred to herein as "high" or "low" indicating that either a high or low voltage state or level exists.

Figure 1:
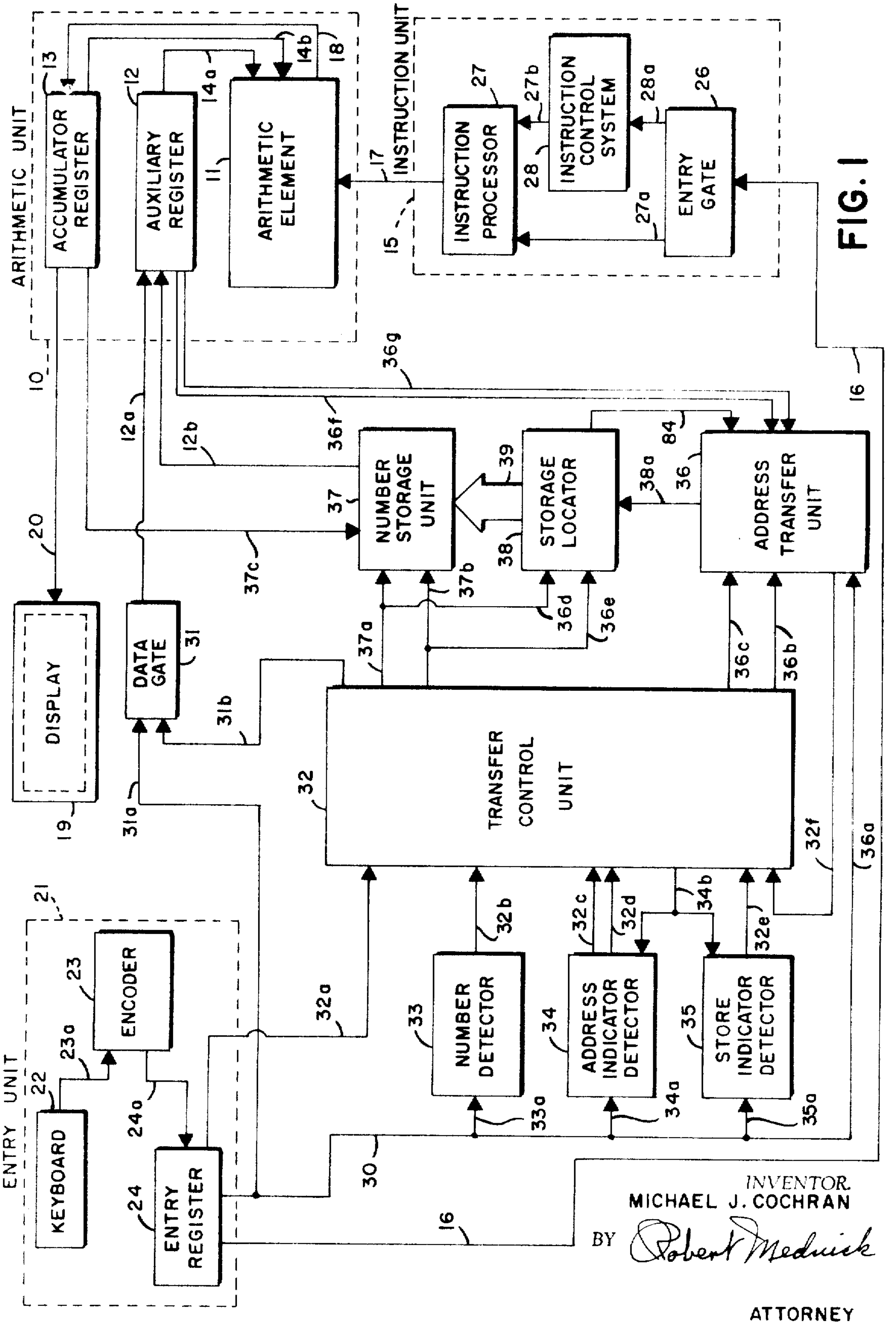
FIG. 1 is a simplified functional block diagram showing the principal units of the calculator with a number processing system in accordance with the present invention.

Referring now to FIG. 1, there is shown therein a functional block diagram illustrating the principal units of an electronic calculator with a number processing system in accordance with the present invention. The calculator includes an arithmetic unit 10 comprising an arithmetic element 11, an auxiliary register 12, and an accumulator register 13. Arithmetic element 11 is the component in arithmetic unit 10 that performs arithmetic operations on data applied thereto on line 14a from auxiliary register 12 and on line 14b from accumulator register 13. The arithmetic operations performed by arithmetic element 11 are in accordance with mathematical instructions supplied in binary form to instruction unit 15 by line 16. These mathematical instructions are converted in instruction unit 15 to subinstructions which are operational signals that are applied to arithmetic element 11 by line 17 to enable calculation to be performed. The results of the calculations performed by arithmetic element 11 are transferred on line 18 to accumulator register 13 to be temporarily stored therein. Display unit 19 is connected to accumulator register 13 by line 20 to read out and display the numbers stored in accumulator register 13.

Entry unit 21 includes keyboard 22, encoder 23, and entry register 24. Keyboard 22 has keys that are manually actuated to make entries to be utilized in the calculations performed by the calculator. Keyboard 22 has number keys, mathematical instruction keys, an address indicator key (which may be called a K-key), and a total or equal (=) key. The keys in keyboard 22 are operated by being sequentially depressed and released in order to supply signals on line 23a to enable encoder 23 to produce corresponding binary signals on line 24a to be temporarily stored in entry register 24. Actuation of the number keys in keyboard 22 will cause binary signals to be produced representing the decimal numbers from 0 to 9. Numbers produced by any of these number keys may be utilized as data or addresses, wherein data is a number used in the calculations performed by arithmetic unit 10, and wherein an address is a number used for locating one of a plurality of storage elements in a storage unit. Actuation of the mathematical instruction keys will cause binary signals to be produced to enable intruction unit 15 to develop operational signals for these instructions. Actuation of the equal key will cause a binary signal to be produced to enable arithmetic unit 10 to complete its calculations. If the equal key is actuated when an instruction signal is not present, then instruction unit 15 ill cause the number in auxiliary register 12 to be transferred to accumulator register 13. Actuation of the address indicator key will cause another binary signal to be produced to enable this calculator to perform addressing operations as hereinafter described. As each entry is made in keyboard 22, any prior entered binary signal existing in entry register 24 is cleared, and the binary signal of the entry that is made is then stored in entry register 24. Entered instruction signals applied to instruction unit 15 are operative on data produced by entry unit 21. Keyboard 22, encoder 23, entry register 24, arithmetic element 11, auxiliary register 12, accumulator register 13, and display unit 19, include components that may be similar in construction and design to those in conventional electronic calculators.

Output line 16 from entry register 24 receives the mathematical instruction signals and the equal signals that are developed in entry register 24. These signals are applied by line 16 to entry gate 26 in instruction unit 15. Depending upon the type of mathematical instructions involved, entry gate 26 will transfer these mathematical instruction signals either to instruction processor 27 by line 27a, or to instruction control system 28 by line 28a. Instruction processor 27 receives the mathematical instructions on lines 27a and 27b to supply a series of operational signals on line 17 to arithmetic element 11 to enable the instructions to be performed. Instruction control system 28 is provided to change the sequence of the mathematical instructions by changing the order in which they are applied by line 27b to instruction processor 27. If such sequential changes are desired, then such an instruction control system may be additionally included in an electronic calculator as shown herein. Otherwise, only a conventional instruction processor may be utilized in said instruction unit.

Bus line 30 from entry register 24 receives the number signals (being either data or addresses), address indicator signals, and also the equal signals that are developed in entry register 24. All of these signals are applied to data gate 31 by line 31a, to number detector 33 by line 33a, to address indicator detector 34 by line 34a, to store indicator detector 35 by line 35a, and to address transfer unit 36 by line 36a. Entry register 24 also develops a start pulse for each signal produced on bus line 30, these start pulses are applied by line 32a to transfer control unit 32. Transfer control unit 32 develops enabling signals on line 31b for data gate 31. The output data signals of data gate 31 are applied by line 12a to auxiliary register 12. Transfer control unit 32 receives number sensing signals on line 32b from number detector 33, address selector signals on line 32c from address indicator detector 34, readdress selector signals on line 32*d* from address indicator detector 34, store sensing signals on line 32 *e* from store indicator detector 35, and address completion signals on line 32*f* from address transfer unit 36. Transfer control unit 32 develops store signals on line 37*a* and recall or retrieve signals on line 37*b*, which are applied to number storage unit 37. The store signals on line 37*a* and the recall signals on line 37*b* from transfer control unit 32 are also respectively applied by lines 36*d* and 36*e* into the storage locator 38. Transfer control unit 32 also develops address transfer signals on line 36*b*, readdress transfer signals on line 36*c*, which are applied to address transfer unit 36. Transfer control unit 32 also develops reset signals on line 34*b* connected to both address indicator detector 34 and store indicator detector 35. Auxiliary register 12 is also connected to address transfer unit 36 by lines 36*f* and 36*g*. Storage locator 38 receives addresses on line 38*a* from address transfer unit 36, and in response thereto provides storage locating signals via broad line 39 to number storage unit 37. Number storage unit 37 is also connected by line 37*c* to receive data from accumulator register 13. The numbers retrieved from number storage unit 37 are applied by line 12*b* to auxiliary register 13.

In the described embodiment, bus line 30 includes four separate electrical connections denoted as A, B, C, and D. These electrical connections A, B, C, and D transfer in parallel the four bit binary signals produced by entry register 24 as herein described. The several differently named signals produced by entry register 24 result from different combinations of four bit binary signals developed by encoder 23 in response to actuation of the several keys in keyboard 22. It will be realized, that entry unit 21 may include other means for producing such or similar combinations of binary signals. In the following figures, the inputs to those nits connecting to entry register 24 will show lines bearing the letters A, B, C, and D to indicate four such separate electrical connections.

Referring now to FIG. 2, there is shown therein a diagram of number detector 33 shown in FIG. 1. The binary signals received on input line 33*a* are indicated to be four bit binary signals separately applied by lines A, B, C, and D. Number decoder 33*b* is responsive only to the combination of binary input signals that respresent decimal digit numbers from 0 to 9. In order to detect the presence of any of these numbers, number decoder 33*b* may be made of diodes forming 10 AND gates. Each AND gate will have four inputs connected to lines A, B, C, and D respectively. Each AND gate will be responsive to one of the 10 numbers to indicate its presence. For example, FIG. 3 shows such an AND gate 33*c* that may be used for sensing the presence of the number "5" in binary form. When this number is present on bus line 30, then lines A and C will be high, and lines B and D will be low. The low voltage levels on lines B and D are seen to be inverted to apply high voltage levels as inputs to AND gate 33*c*. As a result, when the number 5 is present on bus line 30, AND gate 33*c* will develop a high voltage level on its output line 5 to sense the presence of this number. Similarly, the other AND gates in number decoder 33*b* will develop high voltage level signals for the other decimal digit numbers. FIG. 2 shows number decoder 33*b* having ten output lines numbered 0 to 9 to represent the outputs of the 10 AND gates. These 10 output lines are applied by reference line 33*d* to OR gate 33*e*. The output of OR gate 33*e* on line 32*b* will have a high voltage level whenever any one of these number signals exist. As a result, the presence of a high voltage level on line 32*b* is a number sensing signal that indicates a number is present in entry register 24.

Referring now to FIG. 4, there is shown therein a diagram of the address indicator detector 34 shown in FIG. 1. Address indicator detector 34 includes an AND gate 34*c*, a delay circuit 34*d*, another delay circuit 34*e*, an inverter 34*f*, a NOR gate 34*g*, a latch circuit 34*h*, and another latch circuit 34*i*. Delay circuits 34*d* and 34*e* may be monostable multivibrators or other conventional delay circuits that are responsive to a high level voltage to produce a high level voltage a short time later. Latch circuits 34*h* and 34*i* are shown in conventional logic form as a pair of NAND gates wherein the outputs of each is applied as an input to the other. For each latch circuit, a low level voltage applied to its upper input will set the latch circuit and cause a high level voltage at its output (if not already in that condition), and a low level voltage applied to the lower input will reset the latch to cause its output to be low (if not already in that condition). AND circuit 34*c* is only responsive to a four bit binary signal representing the presence of an address indicator signal. When an address indicator signal is present on line 34*a*, then a high voltage level will be present on input lines A, B, and D, and a low voltage level will be present on input line C to be inverted. In that event, AND circuit 34*c* will develop a high voltage level on its output line 34*j*. After being delayed by delay circuits 34*d* and 34*e*, and inverted by inverter 34*f*, latch circuit 34*h* will be set by a high level voltage on line 34*j*. It will be realized that NOR gate 34*g* will only allow latch circuit 34*i* to be set by a high level voltage on line 34*j* if latch circuit 34*h* is already set. Consequently, when a first address indicator signal is received on line 34*a*, latch 34*h* will be set. When a second address indicator signal is received on line 34*a*, then latch circuit 34*i* as well as latch circuit 34*h* will be set. The existence of a high level voltage on output line 32*c* of latch circuit 34*h* is herein called an address selector signal, and the existence of a high level voltage on output line 32*d* of latch circuit 34*i* is herein called a readdress selector signal. As a result, address indicator detector 34 will develop an address selector signal by a single address indicator signal produced by entry unit 21. Further, address indicator detector 34 will also develop a readdress selector signal by two consecutively produced address indicator signals. Latch circuit 34*h* and 34*i* will both be reset by a high voltage level on line 34*b* which is changed by inverter 34*k* to a low voltage level.

Referring now to FIG. 5, there is shown therein a diagram of store indicator detector 35 shown in FIG. 1. Store indicator detector 35 includes an AND gate 35*b*, an inverter 35*c*, and a store latch circuit 35*d*. AND gate 35*b* is only responsive to a store signal produced by entry register 24. Such a store signal may be a four bit binary signal that is different than the others indicated above for number detector 33 and address indicator detector 34. However, in the embodiment of this invention, the binary signal developed by actuation of the equal key in keyboard 22 is also produced on bus line 30 and received by store indicator 35 by line 35*a* The binary signal developed by the equal key is used to develop a store sensing signal as hereinafter indicated.

AND circuit **35*b* is responsive to the presence of this equal signal, which is herein a low level voltage on input lines B, C, and D, and a high level voltage in input line A. When this condition exists, a high voltage level will exist on output line 35*e* to be changed by inverter 35*c* to a low voltage level on line 35*f* in order to set store latch 35*d*. Store latch 35*d* will be reset by a high level voltage on line 34*h* which is inverted to a low level voltage by inverter 35*g*. Store latch 35*d* is identical to the latch circuits previously described and operate in the same manner. Accordingly, when the equal key in keyboard 22 is actuated, store indicator detector 35 will develop a store sensing signal on output line 32*e***.

Figure 6:
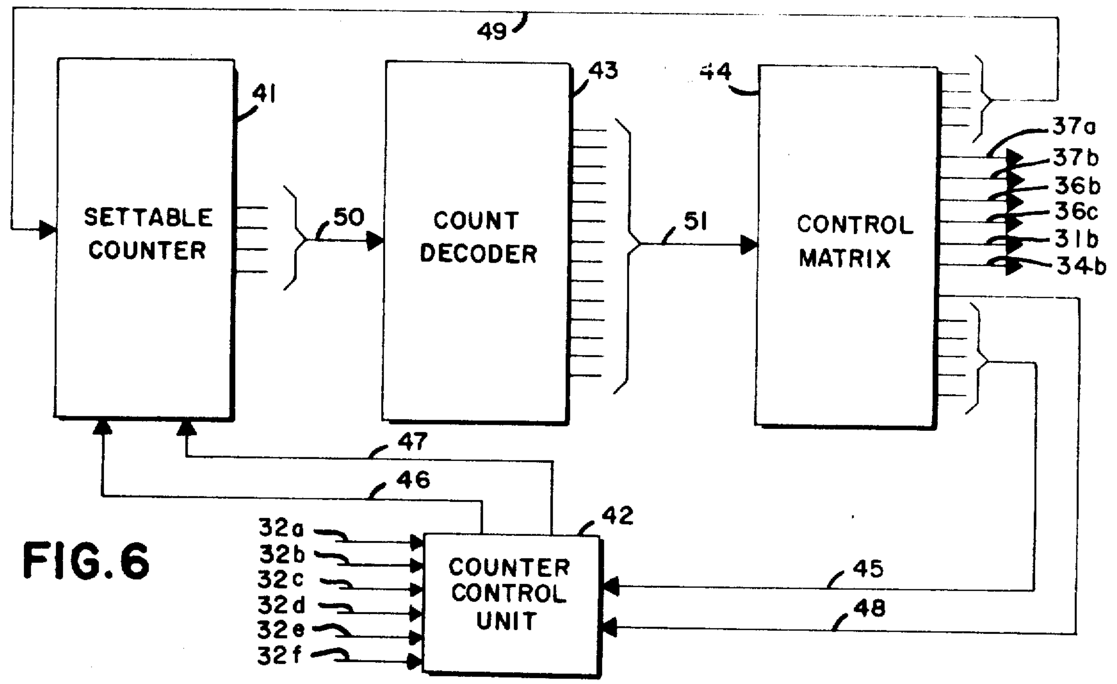
FIG. 6 is a detailed block diagram of the transfer control unit shown in FIG. 1.

Referring now to FIG. 6, there is shown a detailed block diagram of transfer control unit 32 which includes a settable counter 41, a counter control unit 42, a count decoder 43, and a control matrix 44. Number sensing signals on line **32*b*, address selector signals on line 32*c*, readdress selector signals on line 32*d*, store sensing signals on line 32*e*, and address completion signals on line 32*f* are all applied to counter control unit 42. In addition, a start pulse from line 32*a* is also applied to counter control unit 42. Several enabling signals from control matrix 44 are applied to counter control unit 42 as indicated by line 45. In response to these applied signals, counter control unit 42 produces either an advance signal or a set signal applied to settable counter 41 by lines 46 and 47 respectively. A stop signal produced by control matrix 44 on line 48 is also applied to counter control unit 42. Settable counter 41 also receives counter control signals on line 49 from control matrix 44. Settable counter 41 produces a four bit binary signal on its output on line 50 indicating the count therein. In response thereto, count decoder 43 produces output signals on line 51 to be applied to control matrix 44. Count decoder 43 and control matrix 44 form a control signal distributor for transfer control unit 32. In response to the signals on line 51, control matrix 44 produces counter control signals on line 49, counter control enabling signals on line 45, store signals on line 37*a*, recall signals on line 37*b*, address transfer signals on line 36*b*, readdress transfer signals on line 36*c*, enabling signals on line 31*b*, and reset signals on line 34*b***.

FIG. **6*a* shows a detailed diagram of settable counter 41 of FIG. 6 which is seen to include four successive flip-flops 54*a*, 54*b*, 54*c*, and 54*d* connected to form a counter. The Q outputs of these flip-flops are connected to terminals C1, C2, C4, and C8 with the number portion thereof designating the binary count or weight thereof. Except for flip-flop 54*a*, the trigger or complementing inputs T of these flip-flops are taken from the $\bar{Q}$ outputs of the preceding flip-flops for a count up operation. The trigger inputs to flip-flops 54*a* is connected to advance line 46. Accordingly, for each timing pulse existing on advance line 46, the binary counter formed by flip-flops 54*a* to 54*d*** will advance its binary count by one.

Each of flip-flops **54*a* to 54*d* also has s direct set and a direct clear input to enable them to be separately set or cleared. Counter control line M13 from control matrix 44 connects to one input and AND gate 55*a* and through an inverter 56*a* to one input of AND gate 57*a*; the outputs 58*a* and 59*a* of AND gates 55*a* and 57*a* connect to the direct set and direct clear inputs of flip-flop 54*a*. Counter control line M14 from control matrix 44 connects to one input of AND gate 55*b*; the outputs 58*a* and 59*b* of AND gates 55*b* and 56*b* connect to the dirct set and direct clear inputs of flip-flop 54*b*. Counter control lines M15 and M16 are similarly connected to flip-flops 54*c* and 54*d* respectively. When a high voltage level exists on set line 47, each of the flip-flops 54*a* to 54*d* will be caused to be set or cleared depending upon whether or not a high voltage level is present on lines M13, M14, M15, and M16. Accordingly, the count on output terminals C1, C2, C4, and C8 will be advanced by one each time a timing pulse is applied to advance line 46, or alternately the count will be changed to correspond to the input count on counter control lines M13 to M16 each time a timing pulse is applied to set line 47**.

Referring now to FIG. **6*b*, there is shown therein a logic diagram of the counter control unit 42 seen in FIG. 6. Counter control unit 42 includes five AND gates 60*a*, 60*b*, 60*c*, 60*d*, and 60*e* having outputs connected to OR gate 61. Counter control signals on lines M1, M2, M4, M5, and M8 from control matrix 44 are applied as one input to each of AND gates 60*a* to 60*e* respectively. Number sensing signals on line 32*b* are applied as one input to AND gate 60*a*, address selector signals on line 32*c* are applied as one input to AND gate 60*b*, address completion signals on line 32*f* are applied as one input to AND gate 60*c*, readdress selector signals on line 32*d* are applied as one input to AND gate 60*d*, and store sensing signals on line 32*e* are applied as one input to AND gate 60*e*. The output of OR gate 61 is connected as one input to advance AND gate 62, and through an inverter 63 as one input to set AND gate 64. The other inputs to both AND gates 62 and 64 are supplied by line 65**.

Counter control unit 42 is also seen to include a timing pulse generator 66, two AND gates 67 and 68, a flip-flop 69, and a delay circuit 70. Timing pulse generator 66 may be an astable multivibrator for producing a continuous sequence of timing pulses on line 65 when gate 67 is enabled by the Q output of flip-flop 69. A start pulse on line **32*a* from entry register 24 sets flip-flop 69 to enable AND gate 67. A stop signal on line M11 together with a high voltage signal on line 71 will reset flip-flop 69 to disable AND gate 67. The output of AND gate 67 is shown to be applied to stop AND gate 68 through delay circuit 70 to provide a short delay to indicate one way of overcoming a possible race problem when a stop signal is present on line M11 to reset flip-flop 69. Accordingly, it will be realized, that after a start signal sets flip-flop 69, AND gate 67 will enable the timing pulse signals to be applied to either advance line 46 or to set line 47 depending upon whether a high voltage signal is or is not present on the output of OR gate 61. On the other hand, when a stop signal is present on line M11, flip-flop 69 will be reset to diaable AND gate 67 thereby preventing the timing pulses from being applied to advance or set lines 46 and 47**.

As seen in FIG. **6*c*, the lines C1, C2, C4, and C8 from settable counter 41 provide the inputs to count decoder 43. The outputs lines of count decoder 43 are consecutively numbered from D0 to D13 with the number portion thereof representing the count on lines C1, C2, C4, and C8 developed in settable counter 41. Count decoder 43 may include diodes forming AND circuits similar to that shown in FIG. 3. Lines D0 to D13 are applied to control matrix 44 which has output lines shown to be consecutively numbered from M1 through M16**.

FIG. 7 is a chart indicating by cross marks the existence of high output voltage levels of output lines M1 through M16 for each high level input signal on lines D0 through D13. Control matrix 44 may comprise diodes forming OR circuits arranged in a matrix in conventional form to produce combination of output high voltage levels as indicated in the chart of FIG. 7. For example, lines D9 and D10 may be connected by one OR circuit to form a high level voltage on its output being line M10 whenever any one of these counts is present.

Referring now to FIG. 8, there is shown therein a detailed diagram of number storage unit 37 seen in FIG. 1. Storage broad 37 may have any desired number of storage elements. The storage elements are herein identified by addresses having two decimal digit numbers. In order to accommodate address locations with all addresses having two decimal digit numbers from "00" to "99," storage unit 37 will then have one hundred storage elements. In that case the storage elements may be identified by such addresses as seen in FIG. 8 to be enclosed in quotation marks for typical storage elements "00," "01," "21," and "99." Each decimal digit number is represented by four binary bits transferred by line **37*c* into number storage unit 37. Line 37*c* connects to the input lines to all of the storage elements, and line 12*b* connects to the output lines from all of the storage elements. A store signal on line 37*a* will be applied to all of the storage elements, and a recall signal on line 37*b* will be applied to all of the storage elements. Each storage element of number storage unit 37 has a separate storage locating line designated with a K prefix plus its address as seen in FIG. 8. All of these separate storage locating lines are connected to storage locator 38 by broad line 39**.

Referring now to FIG. 9, there is shown therein a more detailed diagram of a typical storage element designated as "21." Storage element "21" includes a storage register "21"*a*, a first three input AND gate "21" *b*, and a second three input AND gate "21"*c*. When a store signal is present on line **37*a*, and when a locating signal is present on storage locating line K21, then storage element "21" will be located to enable a number on line 37*c* to pass through AND gate "21**"*b* and be stored in storage register "21"*a*. When a recall signal is present on line **37*b*, and when a locating signal is present on storage locating line K21, then storage element "21" will be located to enable the contents of storage register "21**"*a* (which may be either an address or data) to pass through AND gate "21"*c* and be transferred out on line **12*b*. Accordingly it will be realized that if any other storage element is located by a locating signal on its storage locating line, then this other storage element will be operative to either store the address on line 37*c* when a store signal is present on line 37*a*, or enable its contents to be retrieved and transferred out on line 12*b* when a recall signal is present on line 37*b***.

Figures 10, 11, 12:
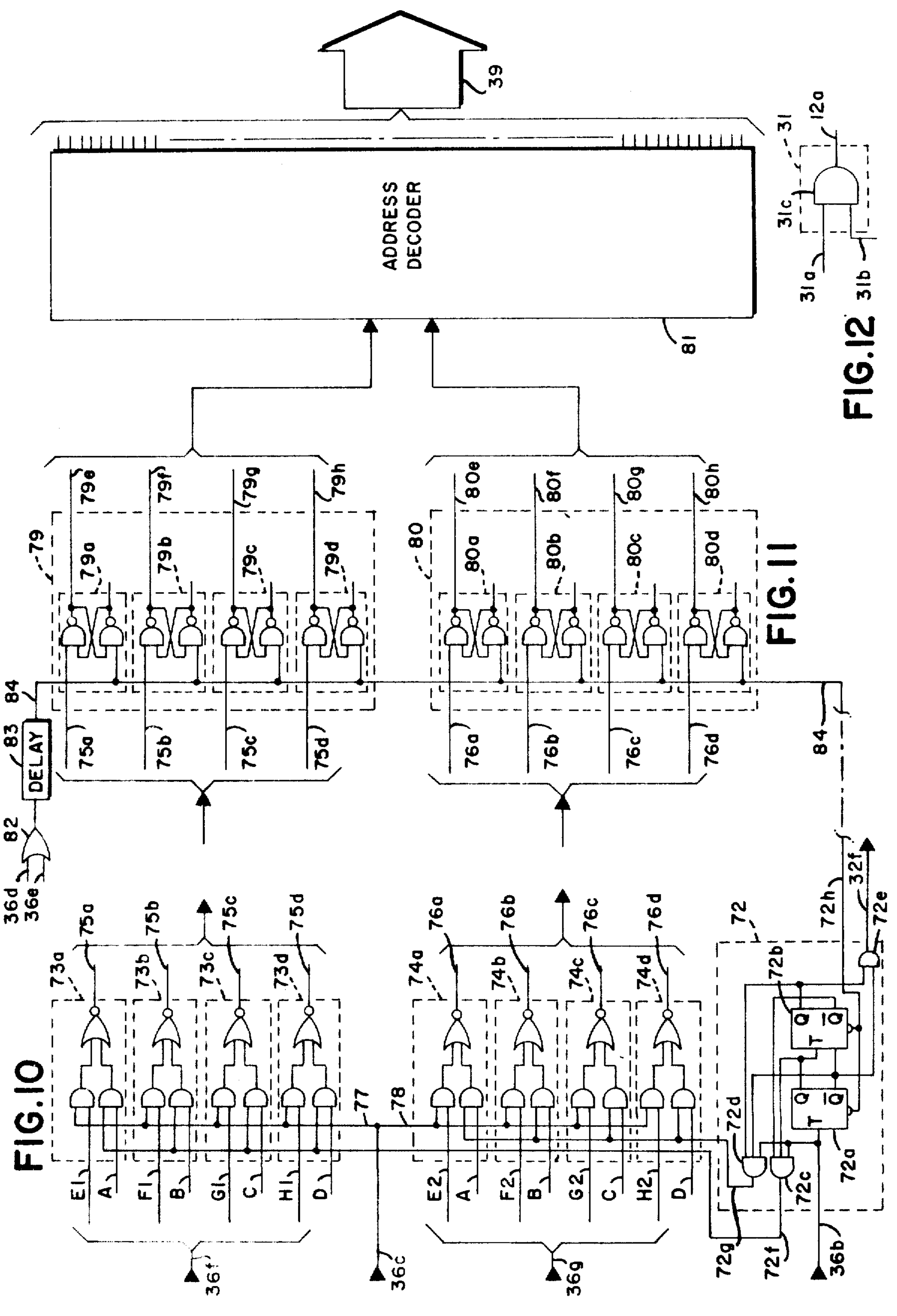
FIG. 10 is a logic diagram of the address transfer unit shown in FIG. 1.
FIG. 11 is a more detailed diagram of the storage locator shown in FIG. 1.
FIG. 12 is a logic diagram of an AND circuit used as the data gate shown in FIG. 1.

Referring now to FIG. 10, there is shown therein a logic diagram of address transfer unit 36 shown in FIG. 1. Address transfer unit 36 includes a counter circuit 72, a first set of four ransfer circuits **73*a*, 73*b*, 73*c*, and 73*d*, and a second set of four transfer circuits 74*a*, 74*b*, 74*c*, and 74*d*. Counter circuit 72 includes flip-flops 72*a* and 72*b* connected to form a counter. The Q output of flip-flop 72*a* is applied to AND gate 72*c* and to the trigger input T of flip-flop 72*b*; and Q output of flip-flop 72*b* is applied to AND gates 72*d* and 72*e*; the $\overline{Q}$ output of flip-flop 72*a* is applied to AND gates 72*d* and 72*e*; and the $\overline{Q}$ output of flip-flop 72*b* is applied to AND gate 72*c*. If both flip-flops 72*a* and 72*b* are reset by a pulse on line 72*h*, then an address transfer signal on line 36*b* will trigger flip-flop 72*a* which will not then change the state of flip-flop 72*b*. As a result, all three inputs to AND gate 72*c* will be high, and a high level voltage will exist on line 72*f*. Thereafter, when another address transfer signal exists on line 36*b*, flip-flop 72*a* will be reset and flip-flop 72*b* will be set. As a result, all three inputs to AND gate 72*d* will be high, and a high level voltage will exist on line 72*g*. Accordingly, two successive address transfer signals on line 36*b* will initially cause line 72*f* to be high while line 72*g* is low, and then cause line 72*g* to be high while 72*f* is low. During the latter stated condition, as AND gate 72*e*, being connected to the Q output of flip-flop 72*b* and the $\overline{Q}$ output of 72*a*, will develop a high level voltage on output line 32*f*** which is the address completion signal.

All of the transfer circuits **73*a* through 73*d*, and 74*a* through 74*d* are identical. As seen in FIG. 10, each transfer circuit includes an upper two input AND gate and a lower two input AND gate, the outputs thereof are applied to a NOR gate. The outputs of the NOR gates of transfer circuits 73*a* to 73*d* are applied to lines 75*a* to 75*d* respectively. The outputs of the NOR gates of transfer circuits 74*a* to 74*d* are applied to lines 76*a* to 76*d* respectively. Lines 77 and line 72*f* respectively connect to the upper and lower AND gates of transfer circuits 73*a* to 73*d*. Line 78 and line 72*g* respectively connect to the upper and lower AND gates of transfer circuits 74*a* to 74*d*. As seen in FIG. 10, the four connecting lines A, B, C, and D, which are included in line 36*a* from entry register 24, are applied to the lower AND gates of transfer circuits 73*a* to 73*d* respectively. Said connecting lines A, B, C, and D are also applied to the lower AND gates of transfer circuits 74*a* to 74*d* respectively. The four connecting lines denoted as E1, F1, G1, and H1, which are included in line 36*f* for the four bit binary signal of the least significant digit position in auxiliary register 12, are applied to the upper AND gates of transfer circuits 73*a* to 73*d* respectively. The four connecting lines, denoted as E2, F2, G2, and H2, which are included in line 36*g* for the four bit binary signal of the next digit position in auxiliary register 12, are applied to the upper AND gates of transfer circuits 74*a* to 74*d* respectively. The above described connections are made since the decimal digit numbers in auxiliary register 12 are herein available to be transferred at the same time, whereas the decimal digit numbers from entry register 24 are available serially. It is to be noted that the most significant digit of a number is customarily the first one to be entered into a calculator, to be followed by the next significant digit, and so forth. Accordingly, if a decimal digit number is produced by entry register 24 to cause a first address transfer signal on line 36*b*, then the decimal digit number will be transferred to output lines 75*a* to 75*d*. Then when another decimal digit number is produced by entry register 24 to cause a second address transfer signal on line 36*b*, then this second produced decimal digit number will be transferred to output lines 76*a* to 76*d*. At this time, an address completion signal is developed on line 32*f*. Now, with flip-flops 72*a* and 72*b* being reset by a signal on line 72*h*, and if a readdress transfer signal exists on line 36*c*, then connecting line 77** will enable the number on line 36*f* to be transferred to output lines 75*a* to 75*d*. At the same time, connecting line 78 will enable the number on line 36*g* to be transferred to output lines 76*a* to 76*d*.

Referring now to FIG. 11, there is shown therein a diagram of storage locator 38 seen in FIG. 1. Storage locator 38 the four includes a first address register 79, a second address register 80, and an address decoder 81. First address register 79 has a set of four identical latch circuits 79*a* to 79*d*, and second address register 80 has another set of our identical latch circuits 80*a* to 80*d*. Latch circuits 79*a* to 79*d* of address register 79 will receive a four bit signal on lines 75*a* to 75*d* which will represent a first decimal digit number of an address, store the four bit signal, and make it available on output lines 79*a* to 79*h* respectively. Latch circuits 80*a* to 80*d* of address register 80 will receive a four bit signal on lines 76*a* to 76*d* which will represent a second decimal digit number of an address, store thefour bit signal, and make it available on output lines 80*e* to 80*h*. Lines 75*a* to 75*d* on lines 76*a* to 76*d* are the outputs from address transfer unit 36 shown in FIG. 10, all of which are included in reference line 38*a* seen in FIG. 1.

Address decoder 81 receives the two decimal digit number signals from address registers 79 and 80 which represent an address for locating a storage element in number storage unit 37. Address decoder may comprise diode circuits arranged to form a plurality of AND circuits so that for each address obtained from address registers 79 and 80, a high level voltage will exist on a single one of its output storage locating lines designated as K00 to K99. As a result, the storage element having the locating line receiving the high level voltage will be "located" in that it will be enabled to either store a number received on line 37*c*, or have its contents retrieved and transferred out on line 12*b* as previously described.

As seen in FIG. 12, data gate 31 may comprise an AND circuit 31*c* which will be enabled when an enabling signal exists on line 31*b*. When enabled, AND circuit 31*c* allows a number on line 31*a* to be transferred by line 12*a* to auxiliary register 12 of arithmetic unit 10.

Figure 6A:
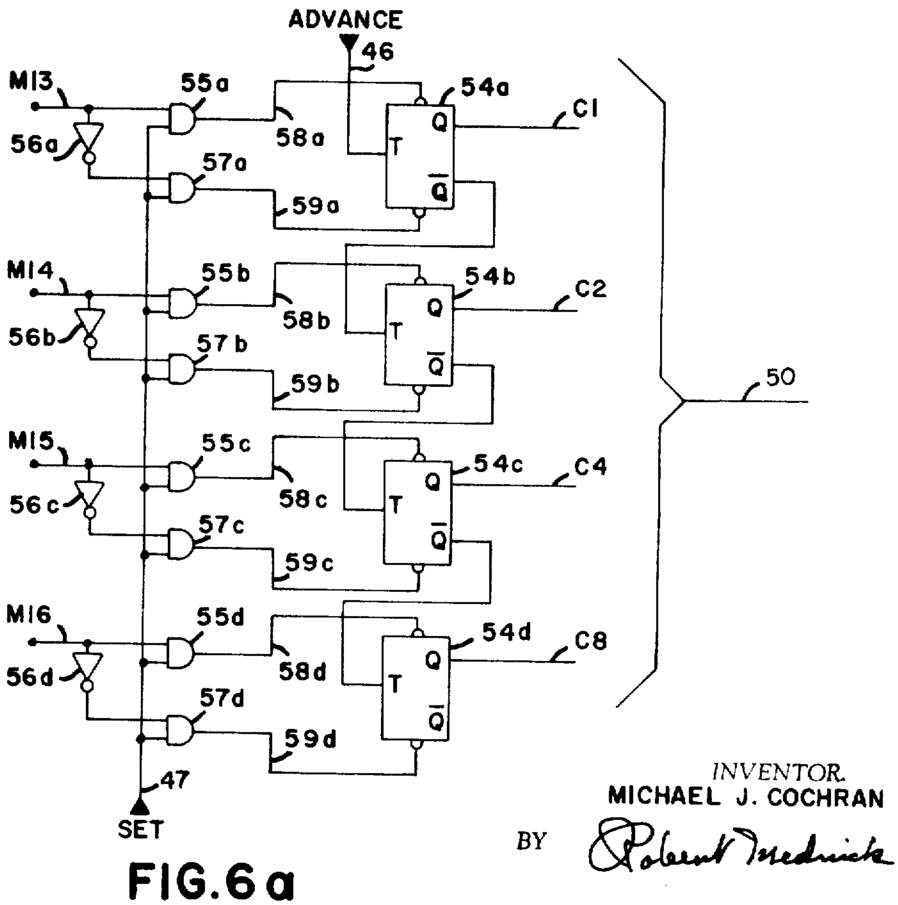
FIG. 6a is a more detailed diagram of the settable counter in the transfer control unit shown in FIG. 6.
Figure 6B:
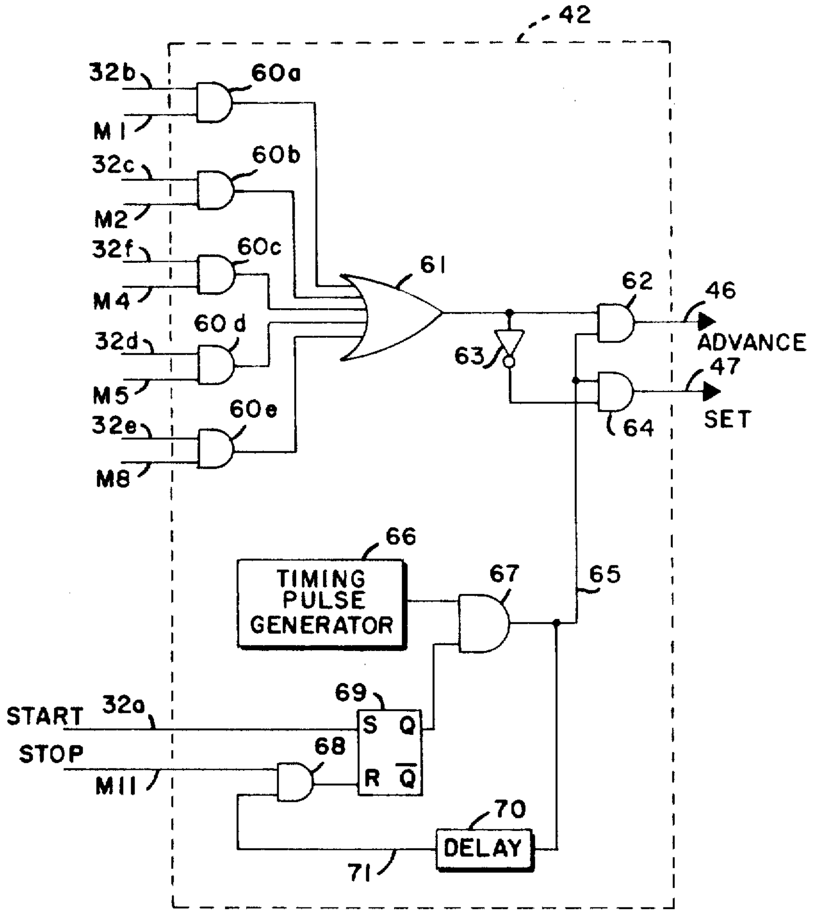
FIG. 6b is a more detailed diagram of the counter control unit in the transfer control unit shown in FIG. 6.
Figure 6C:
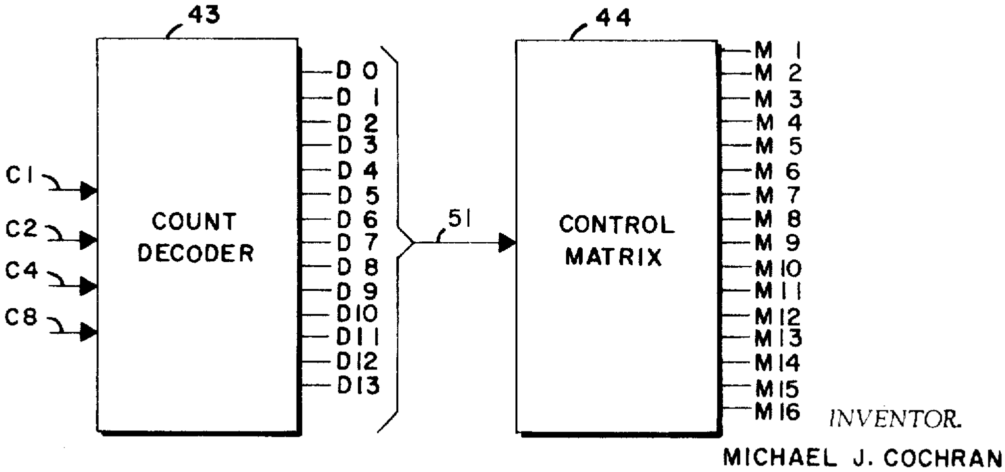
FIG. 6c shows the counter decoder and the control matrix in the transfer control unit seen in FIG. 6.
Figure 13:
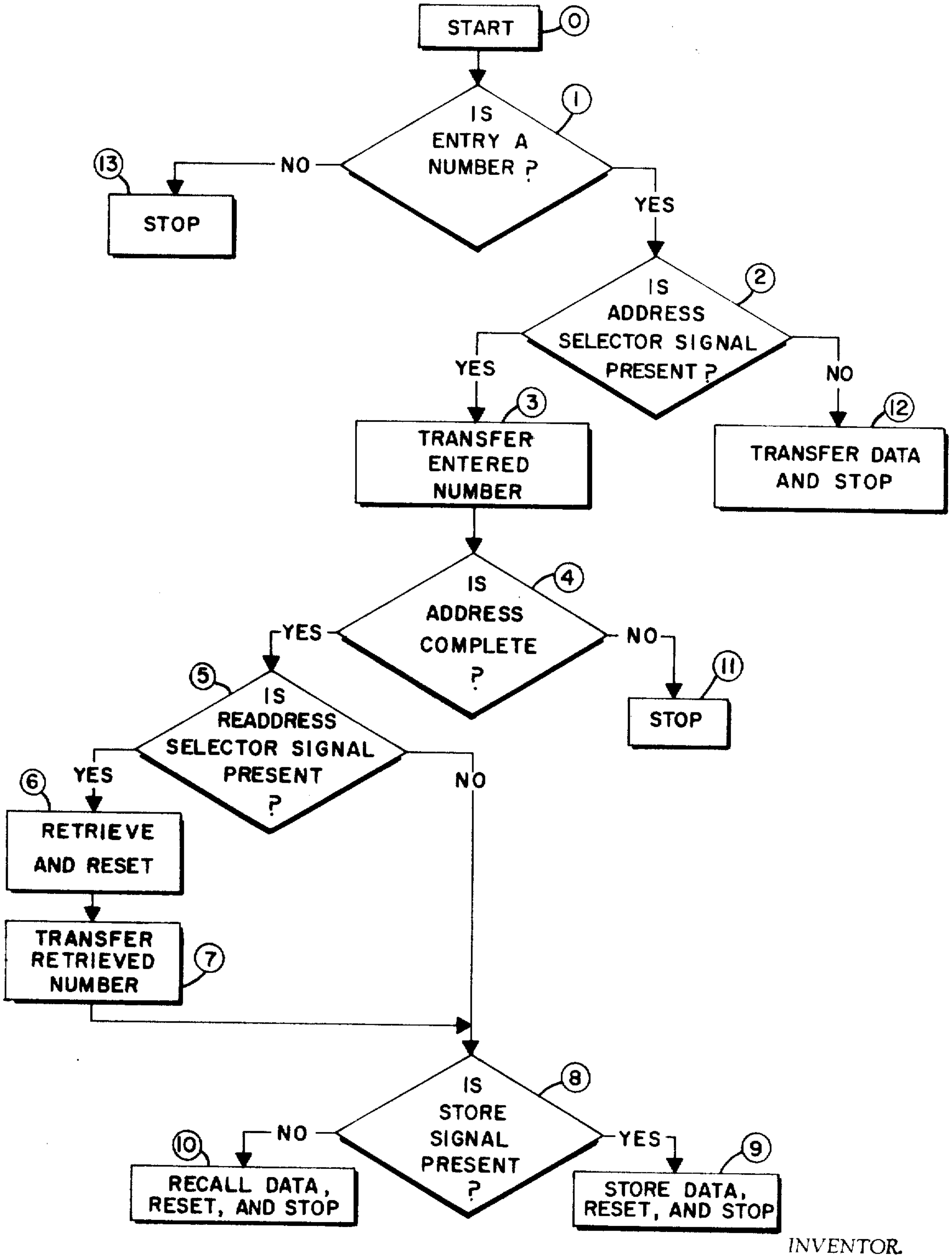
FIG. 13 is a flow diagram illustrating the operation of the number processing system of this invention.

The operation of the transfer contol system will now be considered in relation to the several signal developed by the calculator with the number processing system of this invention. The flow diagram of FIG. 13 illustrates this operation during any single cycle of operation, i.e., from the time when a start pulse is developed on line 32*a* until the time that the trasnfer control system stops operating. In the flow diagram of FIG. 13, the encircled numbers for the quadrilateral symbols indicate the then existing count outputs of settable counter 41. In considering this operation, reference will also be made to the lines interconnecting transfer control unit 32 of FIG. 6 and its components in FIGS. 6*a*, 6*b*, and 6*c*, and to the chart of FIG. 7.

First, it will be assumed that the transfer control system is initially not operating. Upon the entry of either a number signal, an address indicator signal, or an equal signal in entry register 24, a start pulse is applied from line 32*a* to the set input of flip-flop 69 causing its Q output to enable AND gate 67. The next timing pulse produced by timing pulse generator 66 will cause set line 47 to be high. The high level voltage on M13 will directly set flip-flop 54*a*, and the other flip-flops 54*b* to 54*d* will be directly cleared, thereby setting the count output of settable counter 61 to "1."

With the output of settable counter 41 at 1, then M1, M13, M15, and M16 are now high. If only the M1 input to AND gate 60*a* is high, then the output of OR gate 61 will not be high. As M13, M15, and M16 are high, when the next timing pulse is produced on line 65, set line 47 will be high to change the output of settable counter 41 to read "13." On the other hand, if a number sensing signal exists on line 32*b* indicating that either data or an address has been produced by entry register 24, with M1 being high, the output of OR gate 61 will be high. If so, the next timing pulse will cause advance line 46 to go high to increment the count of settable counter 41 to read "2."

If the output of settable counter is at 13, M11 is high. Upon the arrival of the next timing pulse, set line 47 will go high to reset settable counter to "0." Then with M11 being high, start-stop flip-flop 69 will be reset to disable AND gate 67 to stop further timing pulses from being applied to settable counter 41 until flip-flop 69 is again set. Flip-flop 69 will be set by another start pulse on start line 32*a*.

With the output of settable counter 41 at "2," then M2, M15, and M16 are now high. If only the M2 input to AND gate 60*b* is high, then the output of OR gate 61 will not be high. As M15 and M16 are high, when the next timing pulse is produced on line 65, set line 47 will be high to change the output of settable counter 41 to read "12." On the other hand, if an address selector signal exists on line 32*c* indicating that an address indicator signal has been produced by entry register 24, with M2 being high, the output of OR gate 61 will be high, if so, the next timing pulse will cause advance line 46 to go high to increment the count of settable counter 41 to read "3."

If the output of settable counter is at 12, then M11 and M12 are high. M12 connects to line 31*b* and provides the enable signal for data gate 31. With M12 high, the number produced by entry register 24 will be stored in auxiliary register 12. Upon arrival of the next timing pulse, set line 47 will go high to reset settable counter to 0. Then with M11 being high, the cycle of operation of transfer control unit will end or stop as indicated above when settable counter was at 13.

With the output of settable counter at "3," then M3 and M15 are high. M3 connects to line 36*b* to provide the address transfer signal for address transfer unit 36 to enable the number produced by entry register 24 to be applied to transfer circuits 74*a* to 74*d*. However, if a prior number had been applied to transfer circuits 74*a* to 74*d*, then M3 will cause this number to be applied to transfer circuits 73*a* to 73*d*. With M15 being high, when the next timing pulse is produced on line 65, set line 47 will go high to cause flip-flop 54*b* of settable counter 41 to be directly set (the other flip-flops receiving a direct clear signal) to cause the output of settable counter to read "4."

With the output of settable counter 41 at 4, then M4, M13, M14, and M16 are now high. If only the M4 input to AND gate 60*c* is high, then the output of OR gate 61 will not be high. As M13, M14 and M16 are high, when the next timing pulse is produced on line 65, set line 47 will be high to change the output of settable counter 41 to read "11." On the other hand, if an address completion signal exists on line 32*f* indicating two address numbers have been entered, with M4 being high, the output of OR gate 61 will be high. If so, the next timing pulse will cause advance line 46 to go high to increment the count of settable counter 41 to read "5."

If the output of settable couner is at 11, then M11 is high. Upon the arrival of the next timing pulse, set line 47 will go high to reset settable counter to 0. Then with M11 being high, the cycle of operation of transfer countrol unit 32 end or stop.

With the output of settable counter at 5, then M5 and M16 are now high. If only the M5 input to AND gate **60*d* is high, then the output of OR gate 61 will be low. As M5 is high, when the next timing pulse is produced on line 65, set line 47 will be high to change the output of settable counter 41 to read "8." On the other hand, if a readdress selector signal exists on line 32*d* indicating that a second address indicator signal has been produced by entry register 24, with M5 being high, the output of OR gate 61 will be high. If so, the next timing pulse will cause advance line 46 to go high to increment the count of settable counter 41 to read "6.**"

If the output of settable couner is at 6, then M6, M13, M14, and M15 are high. M6 is connected to line **37*b* in number storage unit 33 shown in FIG. 8. With M6 being high, the contents of a located storage element will be transferred to auxiliary register 12. With M13, M14, and M15 being high, the next timing pulse will cause bhe output of settable counter to read "7.**"

As seen in FIG. 1, line **37*b* connects to line 36*e*. Consequently, as seen in FIG. 11, the high voltage level on M6 will also be transferred through OR gate 82, delayed by delay 83, and applied by line 84 to reset the latches in first and second address registers 79 and 80. Further, as line 84 also connects to line 72*h* shown in FIG. 10, the delayed high voltage level on M6 also resets the flip-flops in counter circuit 72**.

With the output of settable counter at 7, then M7, as well as M16, is high. M7 connects to line **36*c* in address transfer unit 36 shown in FIG. 10. M7 provides the readdress transfer signal herein. With M7 being high, the retrieved address from auxiliary register 12 on lines 36*f* and 36*g* will be transferred by address transfer unit 36 to storage locator 38. Thereupon, the retrieved address will locate another storage element as indicated the number of this retrieved address. Now, with M16 being high, the next timing pulse will then cause the output of settable counter 41 to read 8**.

With the output of settable counter 41 at 8, then M8, M14 and M16 are now high. If only the M8 input to AND gate **60*e* is high, then the output of OR gate 61 will not be high. As M14 and M16 are high, when the next timing pulse is produced on line 65, set line 47 will be high to change the output of settable counter 41 to read "10." On the other hand, if a store sensing signal exists on line 32*e*, with M8 being high, the output of OR gate 61 will be high. If so, the next timing pulse will cause advance line 46 to go high to increment the count of settable counter 41 to read "9.**"

With the output of settable counter 41 at 9, then M9, M10 and M11 are high. M9 provides the store signal produced by transfer control unit 32, and is connected to lines **37*a* and 36*d*. M9 being connected to line 37*a* which connects to number storage unit 37 to provide a high voltage level to enable the contents of accumulator register 13 to be transferred by line 37*c* into the located storage element. Also, M9 as well as M6 connects to OR gate 82 shown in FIG. 11. The high voltage level on M9, after being delayed by delay 83, will reset the latches in address registers 79 and 80 to clear the address therein. Furthermore, the flip-flops in counter circuit 72 of FIG. 10 will be reset. M10 connects to line 34*b* and provides the reset signal to reset the latches in address indicator detector 34 and store indicator detector 35. As a result, with M10 being high, this voltage level will clear the the address and readdress selector signals, and will clear the store indicating signal, if such signals exist. M11**, as previously described, will cause transfer control unit to stop operating.

With the output of settable counter 41 at 10, then M6, M10, and M11 are high. As before described, the high voltage level on M6 causes the contents of the located storage element to be transferred to auxiliary register 12. Further, after being delayed by delay 83, the high voltage level on M6 will reset the latches to address registers 79 and 80, and also reset the flip-flops in counter circuit 72. With M10 high, the latches in address indicator detector 34 and store indicator detector 35 will be reset. M11, as previously described, will cause transfer control unit to stop operating.

Having described the operation of the calculator with reference to the several signals developed by the calculator with the number processing system of this invention, now the operation of this calculator with reference to the operating procedure in making entries in entry unit 21 will be described and summarized. This operating procedure with be considered in relation to the solution of a mathematical problem by the use of matrices. Such a solution involves the mathematical procedure of arranging numbers called constants in a rectangular array. Such a rectangular array forms a matrix. Each of the positions in the rows and columns of a matrix is generally indicated by the letter K having two decimal number subscripts naming the row and column in the matrix. The constants in the matrix are combined by mathematical operations such as addition and subtraction. In using the calculator to make such calculations, it would be desirable to store the constants of the matrix, then selectively retrieve them and perform the calculations required by the mathematical procedure for obtaining the solution.

In operating the calculator to enable such calculations to be made, initially the constants of the matrix would be stored in number storage unit 37. In order to store a constant in the calculator of this invention, a number, being a constant assigned to a position in the matrix, is entered by actuating the decimal digit keys of that number in keyboard 22. Each decimal digit of the constant will be transferred through data gate 31 until all the decimal digits of the constant is stored in auxiliary register 12. Then, the equal key is actuated which will transfer the constant from auxiliary register 12 to accumulator register 13. The equal key entry also develops a store sensing signal on line **32*e*. Then, the address indicator key, which can now be conveniently referred to as the K-key, will be actuated to develop an address selector signal on line 32*c*. Thereafter, the address is entered which will be the two numerical subscripts naming the row and column of the matrix. This address is entered by also actuating the decimal digit keys in keyboard 22. When the two decimal numbers of the address have been entered, transfer control unit 32 will transfer the constant in accumulator register 13 to be stored as data in a storage element of number storage unit 37** denoted by said address. This operating procedure in making the entries for storing constants of the matrix is repeated until all the constants have been stored in the storage elements in number storage unit 37.

With all the constants in the matrix stored and available for use, the calculations can be commenced. In order to retrieve a constant, the K-key is first actuated to develop an address selector signal on line 32*c*. Then, the address is entered by actuating the digit keys of the address in keyboard 22. At this time, the constant stored as data for this address is retrieved from number storage unit 37 and transferred into auxiliary register 12. Now, a mathematical instruction such as "add" may be entered into keyboard 22. Thereupon, the constant in auxiliary register 12 will be transferred into accumulator register 13. Then, the above operating procedure is repeated to retrieve another constant and transfer it to auxiliary register 12. Upon the entry of a following mathematical instruction signal, the constant in auxiliary register 12 and the constant in accumulator register 13 will be transferred to arithmetic element 11 by lines 14*a* and 14*b* respectively, to be added, and the result transferred by line 18 to accumulator register 13. The above operating procedure will be continued until all the calculations have been completed. It will be noted that different operating procedures are not required for entering or retrieving data and addresses. Data can be entered directly into the arithmetic unit, or data can be retrieved from storage to be applied to the arithmetic unit for performing calculations. In order to address the storage unit for calculations involving a matrix, an operator can simply enter addresses referring to the positions in the matrix and proceed with the required calculations.

Instead of using direct addressing as above described, it may be desirable to use indirect addressing to locate data. Then the same operating procedure in making entries for direct addressing will be followed, except that instead of actuating the K-key once to provide direct addressing, instead the K-key will be actuated two successive times for indirect addressing. In that event, address indicator detector 34 will develop an address selector signal on line 32*c* as before, and in addition will develop a readdress selector signal on line 32*d*. In accordance with the previously described operation, the first number retrieved by an entered address will be reapplied to address transfer unit 36 as another address to locate another storage element in number storage unit 37. The second number retrieved from number storage unit 37 will now be used as the data in the calculations performed by arithmetic unit 10. Similarly, in order to store data in an indirectly addressed location in the storage unit, first the data is entered, then the equal key is actuated, thereafter the K-key is actuated two times, and finally the address is entered. Accordingly, it will be realized that the calculator with the number processing system of this invention provides an easily operable calculator for the solution of mathematical problems.

Furthermore, this calculator can be utilized for indirectly addressing more than one location in number storage unit 37. FIG. 14 is a diagram of an address indicator detector 90 that may be used for indirectly addressing data two successive times. Address indicator detector 90 of FIG. 14 includes AND gate 34*c*, delay circuit 34*d*, delay circuit 34*e*, inverters 34*f* & 34*k*, NOR gate 34*g*, latch circuit 34*h*, and latch circuit 34*i*. These elements are identical to those shown in FIG. 4 for address indicator detector 34, and therefore are shown in FIG. 14 to bear the same reference numbers. However, address indicator detector 90 of FIG. 14 additionally includes another delay circuit 90*a*, another NOR gate 90*b*, and another latch circuit 90*c*, which are seen to be connected to delay circuit 34*d*, NOR gate 34*g*, and latch circuit 34*i* respectively, in the same manner as the latter three elements are connected in FIG. 4. For a calculator with the address indicator detector of FIG. 14, if said K-key is actuated three times, then an address selector signal will be developed on line 32*c*, a first readdress selector signal will be developed on line 32*d*, and a second readdress selector signal will be developed on line 90*d*. These three selector signals will be applied to a transfer control unit for these selector signals to enable an address (instead of data) to be retrieved a second time in order to locate still another storage element in number storage unit 37. Accordingly, it will now be further realized that a system in accordance with this invention can be utilized for storing data in or retrieving data from a location in a storage unit that may be indirectly addressed any desired number of times.

In the preferred embodiment described above, auxiliary register 12 was shown to be included in arithmetic unit 10 in order to receive data from entry unit 21 as well as to receive data and addresses from number storage unit 37. It will be also realized that a separate holding register can be connected to address transfer unit 36 and number storage unit 37 in order to enable a number retrieved from number storage unit 37 to be reapplied as an address to address transfer unit 36. Either auxiliary register 12 or such other holding register together with address transfer unit 36 comprise the address transfer means to receive an address in order to locate a storage element.

In order to enable transfer control unit 32 to operate as indicated, the signals produced on bus line 30 are developed into other signals. These other developed signals are applied to transfer control unit 32 by number detector 33, address indicator detector 34, and store indicator detector 35, which comprise the entry detector herein. Number storage unit 37 and storage locator 38 comprise the addressable storage means herein.

Although entry unit 21 was described to include manually actuated keys, it will be understood that any other means for producing similar binary signals may be utilized with the calculator of this invention. Furthermore, it will be understood that the binary signals representing the entries produced by entry unit 21 or other entry means may include a combination of bits of any number and in any coded arrangement.

Having described the invention, what is claimed as new is:

1. An electronic calculator with a number processing system, comprising:
 - entry means for producing data and addresses in coded form, said entry means also for producing address indicator signals for each address entered;
 - detector means for receiving said data, addresses, and address indicator signals for producing number sensing signals, store sensing signals, address selector signals, and readdress selector signals in response thereto and in accordance therewith;
 - transfer control means for receiving said number sensing signals, store sensing signals, address selector signals, and readdress selector signals for producing store, recall, address transfer signals, and readdress transfer signals in response thereto and in accordance therewith;

address transfer means for receiving said addresses from said entry means and said address transfer signals from said transfer control means, and for producing address location signals in response thereto, said address transfer means also for receiving said readdress transfer signals from said transfer control means and for receiving the data or addresses from an output terminal of a number storage means and thereby producing readdress location signals;

storage location means for receiving said address location signals and said readdress location signals from said address transfer means and producing storage locator signals in accordance therewith; and number storage means having storage element means for receiving said storage locator signals from said storage locator means, store signals from said transfer control means, and said data and addresses from said entry means, and for storing said data and addresses in one of said storage element means corresponding to said storage locator signals; said number storage means also for receiving said storage locator signals from said storage locator means and said recall signals from said transfer control means thereby producing at an output terminal thereof the data or address stored in one of said storage element means.

2. The calculator according to claim 1 which additionally includes arithmetic means for performing calculations on data applied thereto from said entry means and from said number storage means, said arithmetic means having auxiliary register means for receiving said data from said entry means and from said number storage means and having accumulator register means for receiving both data and the results of the calculations performed by said arithmetic means and for transferring said data to said number storage means.

3. The calculator according to claim 1 wherein said entry means is additionally for producing a plurality of successive address indicator signals for each address; said detector means is additionally for producing an address selector signal in response to the first received address indicator signal and readdress selector signals in response to subsequently received address indicator signals; said transfer control means is additionally for receiving said address selector signal and said readdress selector signals; and producing address transfer signals and readdress transfer signals in response thereto; said address transfer means is additionally for receiving in succession said address transfer signal and said readdress transfer signals and for receiving said data or addresses from said output terminal of said number storage means and thereby producing address and successive readdress location signals; said storage locator means is additionally for receiving said address and successive readdress location signals and thereby producing successive storage locator signals in accordance therewith; and said number storage means is additionally for receiving said successive storage locator signals and thereby successive producing at said output terminal the data or addresses stored in said storage element means corresponding to said successive storage locator signals.

4. A calculator with a number processing system comprising:

entry means including keyboard means for producing data and address signals sequentially in response to actuation of number key means in said keyboard means, and for producing an address indicator signal for each address in response to actuation of address indicator key means in said keyboard means;

detector means for detecting said address indicator signal from all of the entered signals, and for producing and storing therein an address selector signal;

transfer control means for receiving said address selector signal, and for producing an address transfer signal in response thereto;

address transfer means for receiving said addresses from said entry means and said address transfer signals from said transfer control means, and for producing address location signals in response thereto; and storage means having a plurality of addressable storage element means for receiving said address location signals from said address transfer means and thereby storing data and addresses or retrieving data and addresses in response thereto.

5. The calculator according to claim 4 wherein said address transfer means is additionally for producing an address completion signal when the address is complete; said transfer control means is additionally for receiving said address completion signal and producing a reset signal in response thereto; and said detector means is additionally for receiving said reset signal and thereby clearing the address selector signal stored therein.

6. The calculator according to claim 4 which additionally includes arithmetic means comprising arithmetic element means, auxiliary register means, and accumulator register means, said arithmetic means receiving data from said entry means and said storage means, performing calculations thereon, and returning the results of said calculations to said storage means.

7. The calculator according to claim 4 wherein said entry means is also for producing a plurality of successive address indicator signals for each address; said detector means is also for producing and storing therein one or more readdress selector signals in response to said successive address indicator signals; said transfer control means is also for producing readdress transfer signals in response to said readdress selector signals; and said address transfer means is also for receiving said retrieved data and addresses from said storage means and producing readdress location signals in response to said readdress selector signals and said retrieved data, and for producing an address completion signal when the readdress process is complete.

8. A calculator with a number processing system, comprising:

an entry unit to produce number signals corresponding to data and addresses, and to produce an address indicator signal for each address;

an entry detector connected to said entry unit to detect said address indicator signals and to produce address selector signals in response thereto, and to detect said data and address number signals and produce store sensing signals and number sensing signals in response thereto;

a transfer control unit connected to said entry detector to receive said address selector signals, store sensing signals, and number sensing signals, and to produce address transfer signals, store signals, and recall signals in accordance therewith;

an address transfer unit connected to said entry unit and to said transfer control unit to receive said address and said address transfer signal, and to produce an address location signal in response thereto; and storage means having a plurality of addressable storage elements connected to said transfer control unit, to said address transfer unit, and to said entry unit to receive said address location signals, store signals, recall signal signals, and data and addresses, and to manifest storage or recall of said data and addresses in accordance with said address location signals, store signals and recall signals.

9. The calculator according to claim 8 which additionally includes an arithmetic unit having an interconnected combination of an arithmetic element, and auxiliary register, and an accumulator register, wherein said auxiliary register is connected to said entry unit and to said storage unit to receive data and addresses therefrom, said arithmetic element receives data from said auxiliary register and performs calculations thereon, said accumulator register receives the results the calculations from said arithmetic element and transfers said results to said storage unit.

* * * * *

UNITED STATES PATENT OFFICE
CERTIFICATE OF CORRECTION

Patent No. 3,760,370 Dated March 27, 1974

Inventor(s) MICHAEL J. COCHRAN

It is certified that error appears in the above-identified patent and that said Letters Patent are hereby corrected as shown below:

Col. 1, line 56, "elector" should be --selector--

Col. 1, line 62, "sed" should be --used--

Col. 4, line 3, "0 to 9" should be --"0" to "9"--

Col. 4, line 15, "ill" should be --will--

Col. 5, line 37, "nits" should be --units--

Col. 5, line 47, "0 to 9" should be --"0 to 9"--

Col. 5, line 60, "0 to 9" should be --"0 to 9"--

Col. 5, line 66, "0 to 9" should be --"0 to 9"--

Col. 8, line 55, "diaable" should be --disable--

Col. 9, line 62, "ransfer" should be --transfer--

Col. 9, line 67, "and" should be --the--

Col. 11, line 7, delete --the four--

Col. 11, line 16, change "79a" to --79e--

Col. 11, line 19, "thefour" should be --the four--

UNITED STATES PATENT OFFICE
CERTIFICATE OF CORRECTION

Patent No. 3,760,370 Dated March 27, 1974

Inventor(s) MICHAEL J. COCHRAN Page - 2

It is certified that error appears in the above-identified patent and that said Letters Patent are hereby corrected as shown below:

Col. 11, line 21, "on" should be --and--

Col. 11, line 50, after "i.e." delete --,--

Col. 11, line 51, "trasnfer" should be --transfer--

Col. 12, line 16, "13" should be --"13"--

Col. 12, line 37, "12" should be --"12"--

Col. 12, line 43, "0" should be --"0"--

Col. 12, line 45, "13" should be --"13"--

Col. 12, line 59, "4" should be --"4"--

Col. 13, line 4, "11" should be "11"--

Col. 13, line 6, "0" should be --"0"--

Col. 13, line 9, "5" should be --"5"--

Col. 13, line 22, "6" should be --"6"--

Col. 13, line 37, "7" should be --"7"--

Col. 13, line 47, "8" should be --"8"--

Col. 13, line 48, "8" should be --"8"--

Col. 13, line 59, "9" should be --"9"--

Col. 14, line 8, after "clear" delete --the--

FORM PO-1050 (10-69)

USCOMM-DC 60376-P69
☆ U.S. GOVERNMENT PRINTING OFFICE 1969 O—366-334

UNITED STATES PATENT OFFICE
CERTIFICATE OF CORRECTION

Patent No. 3,760,370 Dated March 27, 1974

Page - 3

Inventor(s) MICHAEL J. COCHRAN

It is certified that error appears in the above-identified patent and that said Letters Patent are hereby corrected as shown below:

Col.14, line 12, "10" should be --"10"--

Col.14, line 17, "to" should be --in--

Signed and sealed this 1st day of October 1974.

(SEAL)
Attest:

McCOY M. GIBSON JR.
Attesting Officer

C. MARSHALL DANN
Commissioner of Patents